United States Patent
Hou et al.

(10) Patent No.: US 11,069,009 B2
(45) Date of Patent: Jul. 20, 2021

(54) SYSTEM, METHOD AND APPARATUSES FOR IDENTIFYING LOAD VOLATILITY OF A POWER CUSTOMER AND A TANGIBLE COMPUTER READABLE MEDIUM

(71) Applicant: Accenture Global Services Limited, Dublin (IE)

(72) Inventors: Fang Hou, Beijing (CN); Qin Zhou, Beijing (CN); Ming Li, Beijing (CN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1158 days.

(21) Appl. No.: 15/311,819

(22) PCT Filed: May 16, 2014

(86) PCT No.: PCT/CN2014/077646
§ 371 (c)(1),
(2) Date: Nov. 16, 2016

(87) PCT Pub. No.: WO2015/172374
PCT Pub. Date: Nov. 19, 2018

(65) Prior Publication Data
US 2017/0083990 A1    Mar. 23, 2017

(51) Int. Cl.
*G06Q 50/06* (2012.01)
*G06F 17/18* (2006.01)
*H02J 3/00* (2006.01)

(52) U.S. Cl.
CPC ........... *G06Q 50/06* (2013.01); *G06F 17/18* (2013.01); *H02J 3/003* (2020.01); *Y04S 40/20* (2013.01)

(58) Field of Classification Search
CPC .......... G06Q 50/06; G06F 17/18; H02J 3/003; H02J 13/0006
(Continued)

(56) References Cited

U.S. PATENT DOCUMENTS

2003/0014507 A1* 1/2003 Bertram ............... G06F 11/3409
709/223
2011/0072016 A1* 3/2011 Tsai .................. G06F 16/35
707/737

(Continued)

FOREIGN PATENT DOCUMENTS

CN  103325071 A  *  9/2013
CN  103325071 A      9/2013

OTHER PUBLICATIONS

Zhang, Ke. "A new local distance-based outlier detection approach for scattered real-world data." 13th Pacific-Asia Conference. Apr. 2009. Pgs. (Year: 2009).*

(Continued)

*Primary Examiner* — John P Go
*Assistant Examiner* — Hunter A Molnar
(74) *Attorney, Agent, or Firm* — Brinks Gilson & Lione

(57) ABSTRACT

The present disclosure relates to system, method and apparatuses for identifying load volatility of a power customary and a tangible computer readable medium therefor. In an embodiment of the present disclosure, the system comprises at least one processor; and at least one memory storing computer executable instructions. The at least one memory and the computer executable instructions are configured to, with the at least one processor, cause the system to determine boundary points for splitting a load curve of a power customer automatically, through performing density-based spatial clustering on data points of the load curve of the power customer; and detect tendency turning points of the load curve by means of the determined boundary points, so as to identify the load volatility of the power customer. With embodiments of the present disclosure, the boundary points for splitting the load curve may be determined automatically based on load data of each power customer instead of using a predetermined threshold and thus the load volatility of the (Continued)

load curve, which could provide a solution of self-adapted auto-identification for load volatility.

22 Claims, 10 Drawing Sheets

(58) Field of Classification Search
USPC .......................................................... 705/7.35
See application file for complete search history.

(56) References Cited

U.S. PATENT DOCUMENTS

| 2013/0144575 | A1* | 6/2013 | Seyhan | G06Q 10/06 |
| | | | | 703/2 |
| 2014/0074304 | A1 | 3/2014 | Hou et al. | |
| 2014/0129160 | A1* | 5/2014 | Tran | H02J 3/14 |
| | | | | 702/61 |
| 2014/0156322 | A1* | 6/2014 | Monforte | G06Q 50/06 |
| | | | | 705/7.11 |
| 2014/0188565 | A1* | 7/2014 | Dantressangle | G06Q 50/06 |
| | | | | 705/7.33 |

OTHER PUBLICATIONS

Liu, Qing-Bao. "Relative density based k-nearest neighbors clustering algorithm." Nov. 2003. National University of Defense Technology. pp. 814-817. (Year: 2003).*

Zavrel, Jakub. "An empirical re-examination of weighted voting for k-NN." Proceedings of the 7th Belgian-Dutch Conference on Machine Learning. 1997. p. 1 (Year: 1997).*

Tseng, Vincent. "Cluster-based generic segmentation of time series with DWT." Jun. 2009. Elsevier, Pattern Recognition Letters 30. p. 1195. (Year: 2009).*

Yin, Jiangling. "Financial time series segmentation based on turning points." Jun. 2011. University of Macau. pp. 395-399. (Year: 2011).*

Azami, Hamed. "An improved signal segmentation using moving average and savitzky-golay filter." Journal of signal and information processing, 2012, 3. pp. 41-42. (Year: 2012).*

Nilsson, Ronny. "OECD system of leading indicators." Nov. 2007. p. 9. (Year: 2007).*

Zhang, Ke. "A New Local Distance-Based Outlier Detection Approach for Scattered Real-World Data." Match 2009. RSISE, Australian National University. pp. 814-817. (Year: 2009).*

Xie, Juanying. "Robust clustering by detecting density peaks and assigning points based on fuzzy weighted K-nearest neighbors." Mar. 12, 2016. pp. 20, 26-27. (Year: 2016).*

Zhihui Guo, W. Li, A. Lau, T. Inga-Rojas and K. Wang, "Trend based periodicity detection for load curve data," 2013 IEEE Power & Energy Society General Meeting, 2013, pp. 1-5 (Year: 2013).*

Seungwoo Lee, Daye Ahn, Sukjun Lee, Rhan Ha and Hojung Cha, "Personalized Energy Auditor: Estimating personal electricity usage," 2014 IEEE International Conference on Pervasive Computing and Communications (PerCom), 2014, pp. 44-49 (Year: 2014 ).*

S. Rollins and N. Banerjee, "Using rule mining to understand appliance energy consumption patterns," 2014 IEEE International Conference on Pervasive Computing and Communications (PerCom), 2014, pp. 29-37 (Year: 2014).*

S. Frank, L. Gentile Polese, E. Rader, M. Sheppy and J. Smith, "Extracting Operating Modes from Building Electrical Load Data," 2011 IEEE Green Technologies Conference (IEEE-Green), 2011, pp. 1-6 (Year: 2011).*

Y. Ou, L. Cao, T. Yu and C. Zhang, "Detecting Turning Points of Trading Price and Return Volatility for Market Surveillance Agents, " 2007 IEEE/WIC/ACM International Conferences on Web Intelligence and Intelligent Agent Technology—Workshops, 2007, pp. 491-494 (Year: 2007).*

Chinese Office Action with English translation, dated Jan. 9, 2019, pp. 1-6, issued in Chinese Patent Application No. 2014800789063, State Intellectual Property Office, Beijing, People's Republic of China.

International Search Report and Written Opinion, dated Feb. 4, 2015, pp. 1-6, issued in International Application No. PCT/CN2014/077646, State Intellectual Property Office of the P.R. China, Beijing, China.

* cited by examiner

SYSTEM, METHOD AND APPARATUSES FOR IDENTIFYING LOAD VOLATILITY OF A POWER CUSTOMER AND A TANGIBLE COMPUTER READABLE MEDIUM

TECHNICAL FIELD

Embodiments of the present disclosure relate to the field of power grid technology and more particularly to system, method, and apparatuses for identifying load volatility of a power customer and a tangible computer readable medium.

BACKGROUND

Various industries have networks associated with them. One such industry is the utility industry that manages a power grid. The power grid may include one or all of the following: electricity generation, electric power transmission, and electricity distribution. Electricity may be generated using generating stations, such as a coal fire power plant, a nuclear power plant, etc. For efficiency purposes, the generated electrical power is stepped up to a very high voltage (such as, for example, 345K Volts) and transmitted over transmission lines. The transmission lines may transmit the power in long distances, such as across state lines or across international boundaries, until it reaches its wholesale customer, which may be a company that owns the local distribution network. The transmission lines may terminate at a transmission substation, which may step down the very high voltage to an intermediate voltage (such as, for example, 138K Volts). From a transmission substation, smaller transmission lines (such as, for example, sub-transmission lines) transmit the intermediate voltage to distribution substations. At the distribution substations, the intermediate voltage may be again stepped down to a "medium voltage" (such as, for example, from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as, for example, 120V). The consumer voltage may then be used by the consumers.

Different customers have different power usage behavior, which can be seen from, for example, FIG. 1. It can be seen that a part of customers require more power in the daytime, another part of customers require more power on nights and the further part of customer has a substantially constant power demand all the day. It will be beneficial to learn characteristics of customers' electricity usage, because it can help to understand their usage behavior preferences, which is very useful to the utilities' business such as demand side management. This will facilitate to achieve a better interaction with the customers to use power energy and power equipment more efficiently, improve the investment efficiency of the power industry, reduce the cost, enhance the level of resource optimization configuration among the power generation, power transmission power distribution and customers, to meet the increasingly critical challenges such as bigger number of customers, higher service expectation, stricter demand side management (DSM) requirement from governments, etc.

The customers' electricity usage behavior preferences can be represented through their usage volatility. Due to the large scale of customer size, it would be far more practical to automatically recognize customers' usage volatility than through manual observation and process. The usage volatility auto-identification can help utilities to quickly identify the customers' usage characteristics, find out the typical customers, and based on that to better and effectively support utilities' business.

Generally the load volatility can be characterized by the tendency turning points of a load curve of a power customer. A customer's daily load curve usually consists of 24 or 96 measured load values or points depending on whether the smart meter is collecting the usage data hourly or every 15 minutes. The tendency turning points are transition points in the load curve, where the load variation tendency changes from uptrend to downtrend or from downtrend to uptrend. In this sense, identifying the load volatility is just to identify the tendency turning points of a load curve.

Many studies were conducted to identify the trend of time series data. Most of the methods are based on piecewise approximation, which would split the time series data into several segments and then perform the linear approximation within each segment. This piecewise approximation can help to identify the main fluctuation of the time series data and filter out the noises. The key problem of piecewise approximation is how to determine reasonable pre-specified boundaries of the split pieces. Regarding the boundary determination, a lot of work has been done and they can be classified into two types: (1) Error norm based: piecewise approximation, such as sliding window, top-down, bottom-up, etc., (2) special points based, such as landmarks, series important points, etc.

Although these piecewise approximation based methods have been applied in hydrology, stock prediction, and aerospace, etc., they cannot be used in load volatility identification because these methods all need pre-specified threshold to control the error norm or number of pieces. While the customers' volatilities are random and diversified, and one certain threshold can't meet all different kinds of volatilities and on the other hand, unlike the other application which care about error norm, the utilities care more about the load fluctuation trends. Therefore, currently, there is no load volatility identification solution in the power industry yet.

SUMMARY OF THE DISCLOSURE

To this end, according to a first aspect of the present disclosure, there is provided a system for identifying load volatility of a power customer. The system comprises: at least one processor; and at least one memory storing computer executable instructions. The at least one memory and the computer executable instructions is configured to, with the at least one processor, cause the system to: determine boundary points for splitting a load curve of a power customer automatically, through performing density-based spatial clustering on data points of the load curve of the power customer; and detect tendency turning points of the load curve by means of the determined boundary points, so as to identify the load volatility of the power customer.

In an embodiment of the present disclosure, the density-based spatial clustering may be performed based on clustering parameters including a minimum number of data points as required in a cluster and scanning radius.

In another embodiment of the present disclosure, the scanning radius may be determined based on K-distance of points of the load curve of the power customer, wherein the K-distance is a distance of a data point from its nearest K-th data point and the K equals to the minimum number of data points required in a cluster.

In a further embodiment of the present disclosure, the scanning radius may be determined as K-distance of a point of a sequenced K-distance plot which is furthest from a line through a start point and an end point of the sequenced K-distance plot, wherein the sequenced K-distance plot is a plot formed from data points sequenced by K-distance.

In a still further embodiment of the present disclosure, the minimum number of data points required in a cluster may be defined as the number of data points collected in an hour.

In a yet further embodiment of the present disclosure, the detecting tendency turning points of the load curve may comprise: detecting turning points in the each piece of the load curve split based on the determined boundary points.

In a still yet further embodiment of the present disclosure, the detecting tendency turning points of the load curve may further comprise: detecting a missing turning point in each piece of the load curve re-split by at least partially using the detected turning points.

In a yet still further embodiment of the present disclosure, wherein the system may be further configured to perform moving average on the data points of the load curve of the power customer repeatedly before determining the boundary points, until the number of turning points of the load curve is not decreased.

In another embodiment of the present disclosure, the system may be further configured to perform linear interpolation on the boundary points and the detected turning points.

In another embodiment of the present disclosure, the system may be further configured to identify main tendency turning points representing main fluctuations of the load volatility of the power customer by omitting middle points of adjacent segments with same tendency.

According to a second aspect of the present disclosure, there is provided a method for identifying load volatility of a power customer. The method comprises: determining boundary points for splitting a load curve of a power customer automatically, through performing density-based spatial clustering on data points of the load curve of the power customer; and detecting tendency turning points of the load curve by means of the determined boundary points, so as to identify the load volatility of the power customer.

According to a third aspect of the present disclosure, there is provided an apparatus for identifying load volatility of a power customer. The apparatus comprises: means for determining boundary points for splitting a load curve of a power customer automatically, through performing density-based spatial clustering on data points of the load curve of the power customer; and means for detecting tendency turning points of the load curve by means of the determined boundary points, so as to identify the load volatility of the power customer.

According to a fourth aspect of the present disclosure, there is provided another apparatus for identifying load volatility of a power customer. The method comprises: boundary point determination module configured to determine boundary points for splitting a load curve of a power customer automatically, through performing density-based spatial clustering on data points of the load curve of the power customer; and tendency point detection module configured to detect tendency turning points of the load curve by means of the determined boundary points, so as to identify the load volatility of the power customer.

According to a fifth aspect of the present disclosure, there is provided a tangible computer-readable medium having a plurality of instructions executable by a processor to reconfigure a distribution network. The tangible computer-readable medium may comprise instructions configured to perform steps of the method according to the second aspect of present disclosure.

With embodiments of the present disclosure, the boundary points for splitting the load curve may be determined automatically based on load data of each power customer instead of using a predetermined threshold and thus the load volatility of the load curve, which could provide a solution of self-adapted auto-identification for load volatility.

BRIEF DESCRIPTION OF THE DRAWINGS

The above and other features of the present disclosure will become more apparent through detailed explanation on the embodiments as illustrated in the embodiments with reference to the accompanying drawings wherein like reference numbers represent same or similar components throughout the accompanying drawings of the present disclosure, wherein.

DETAILED DESCRIPTION OF EMBODIMENTS

Hereinafter, embodiments of the present disclosure will be described with reference to the accompanying drawings. In the following description, numerous specific details are set forth in order to provide a thorough understanding of the embodiments. However, it is apparent to the skilled in the art that implementation of the present disclosure may not have these details and the present disclosure is not limited to the particular embodiments as introduced herein. On the contrary, any arbitrary combination of the following features and elements may be considered to implement and practice the present disclosure, regardless of whether they involve different embodiments. Thus, the following aspects, features and embodiments are only for illustrative purposes, and should not be understood as elements or limitations of the appended claims, unless otherwise explicitly specified in the claims. Additionally, in some instances, well known methods and structures have not been described in detail so as not to unnecessarily obscure the embodiments of the present disclosure.

As mentioned before, the existing trend identification scheme is not suitable for the load volatility identification, while in the art, the automatic identification of load volatility is in urgent need. Hence, in the present disclosure, a solution for identifying load volatility of a power customer is proposed to achieve a self-adapted auto-identification for load volatility.

Next, a method for identifying load volatility of a power customer as proposed in the present disclosure will be described with reference to FIG. 2, which schematically illustrates a flow chart of a method for identifying load volatility of a power customer according to an embodiment of the present disclosure.

Figure 1:
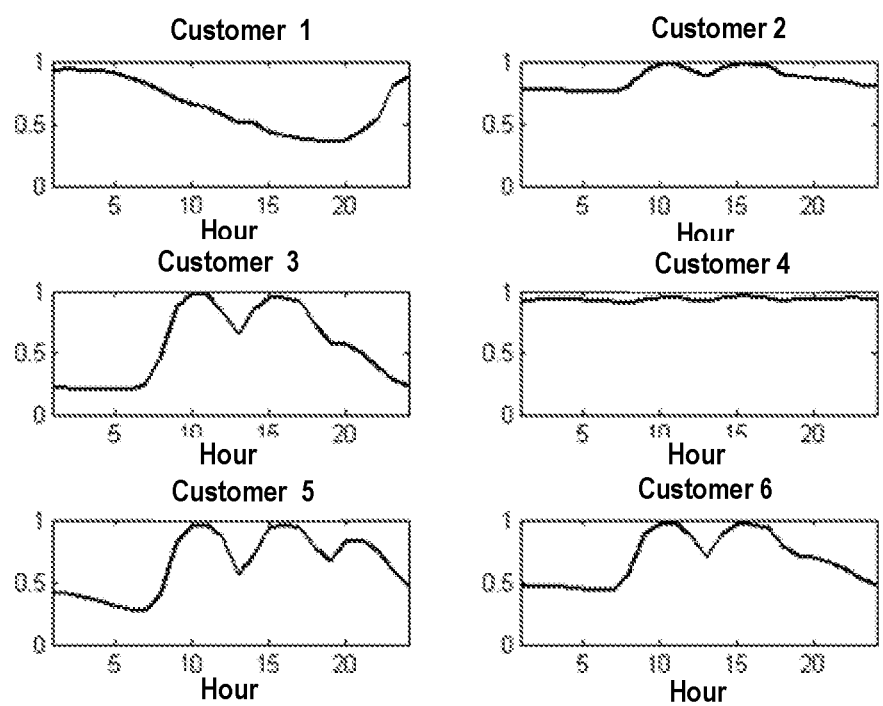
FIG. 1 schematically illustrates a diagram of power usage behaviors of different power customers.
Figure 2:
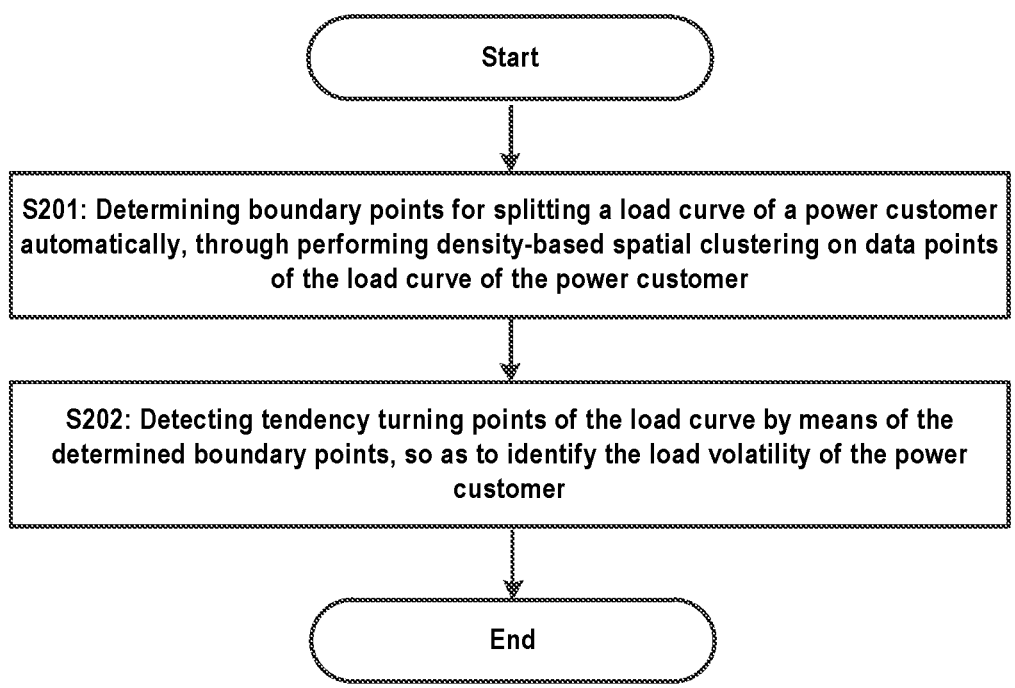
FIG. 2 schematically illustrates a flow chart of a method for identifying load volatility of a power customer according to an embodiment of the present disclosure.

As illustrated in FIG. 2, first at step S201, boundary points for splitting the load curve of the power customer is determined automatically through performing a density-based spatial clustering on data points of load curve of a power customer.

As is known, the customers' volatilities are random and diversified, and one certain threshold can't meet all different kinds of volatilities and on the other hand, unlike the other application which cares about error norm, the utilities care more about the load fluctuation trends. Thus there is needed for an approach to find suitable boundary points for different customers.

The inventors noticed the load curve has its own character, i.e., the distribution of load points during peak or valley periods are more intensive than that of shoulder periods. The boundary point determination may use this character, which enables density-based data mining techniques to be used to identify the peak and valley segments of the load curve. In the present disclosure, the inventors propose to use a density-based spatial clustering to find boundary points for splitting the load curve, which introduces enhancements of the distance definition and the auto-determination of clustering parameters. Herein, this algorithm may be called as enhanced Density-Based Spatial Clustering of Application with Noise (DBSCAN), which will be described hereinafter.

The clustering may be performed based on the original data points of the load curve; however, it is preferable to perform the clustering on filtered data points to improve the performance of the subsequent tendency identification operations. That is to say, before the clustering, it may use a filter to filter out noise points of the load curve. There are a lot of filtering techniques, such as moving average (MA), average median filtering, first order lag filtering, and so on, each of which can be used herein.

However, in the present disclosure, there is proposed a new filtering approach which may be called as Loop Moving Average (LMA). The MA method per see is a well-known smoothing forecasting technique to filter out the random noise. While the inventors notice that the regular MA approach just performs a move average once and it may not filter out all noise points and many noise points still exist. To enhance the regular MA approach, circulation is introduced into this method to form the LMA method, which means repeating MA for several times to get better effects than applying the MA only once.

Although it is possible to pre-determine the number of repeating the MA, an interaction termination condition is introduced in the present disclosure to avoid over-filtering these data points by too many iterations of MA. Next, the MA calculation and iteration terminating condition of LMA will be described in detail.

Moving Average (MA) Calculation

The MA calculation is to replace the value of each point in a load curve with the average value of that point and its nearest neighbor points.

If a customer's daily load curve represented by a group of data (or points) as, $$L=\{P(1),P(2),\ldots,P(n)\} \quad (1)$$

where P(i) designates the load value of the customer in the i-th period of the day, n designates the total number of time periods per day, the smoothed load after MA can be calculated as, $$P'(i) = \frac{P(i-1) + P(i) + P(i+1)}{3} \quad (2)$$

Iteration Terminating Condition of LMA

It can be understood that too many MA repetitions may lead to over-filtering and waveform distortion, which means the tendency turning points are probably filtered out too. Thus, an iteration terminating condition is required to control the cycling times of LMA to a reasonable level. It can be also appreciated that the repetition times of MA should be an adaptive number according to different load curve rather than a pre-specified value and an effective MA iteration should be able to reduce the noise points; otherwise, this MA loop should be terminated. So the iteration terminating condition could be whether the noise points decreases or not by each MA iteration.

On the other hand, the inventors notice that the decreasing of noise points will lead to the decreasing of turning points and it's much easier to count the number of turning points than to count noise points. Accordingly, in the present disclosure, the iteration terminating condition could be proposed, in a more practical way, as whether the number of turning points of the load data is decreased or not by the current MA iteration.

Figure 3:
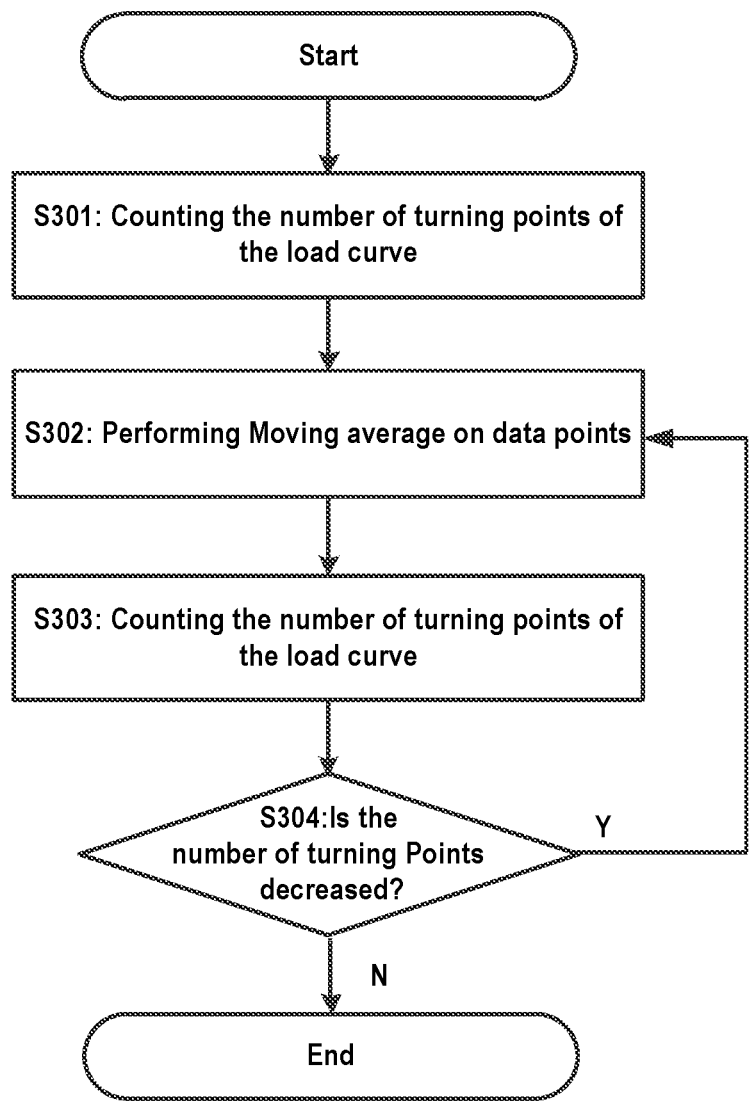
FIG. 3 schematically illustrates a flow chart of a method for filtering out noise points in the load curve according to an embodiment of the present disclosure.

FIG. 3 illustrates a process of performing LMA on data points of the load curve according to an embodiment of the present disclosure. As illustrated in FIG. 3, first at step S301, the number of the turning points of the load curve is counted. Then at step S302, the moving average is performed on data points of the load curve. After the moving average, at step S303, the number of turning points of the new load curve is determined again. Next, at step S304, the newly determined number is compared with the previous one to determine whether the number of turning point is decreased. If yes, the method return to step S302 and enters another loop; otherwise, the method is ended and the final filtered load data is obtained.

Figure 4A:
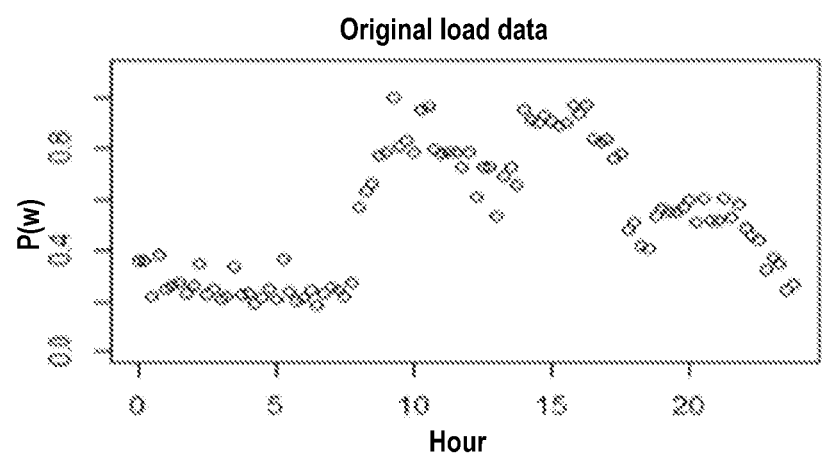
FIGS. 4A to 4C schematically illustrates diagrams of original load data, pre-processed load data after traditional MA, and preprocessed data after LMA according to an embodiment of the present disclosure.
Figure 4B:
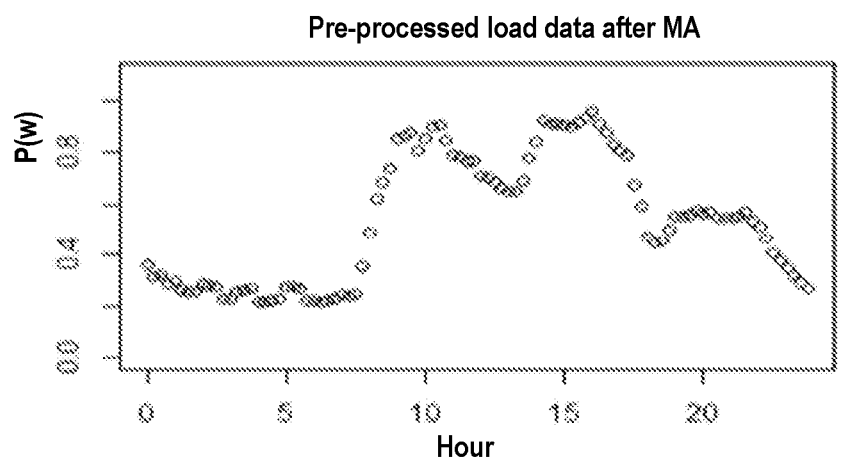
Figure 4C:
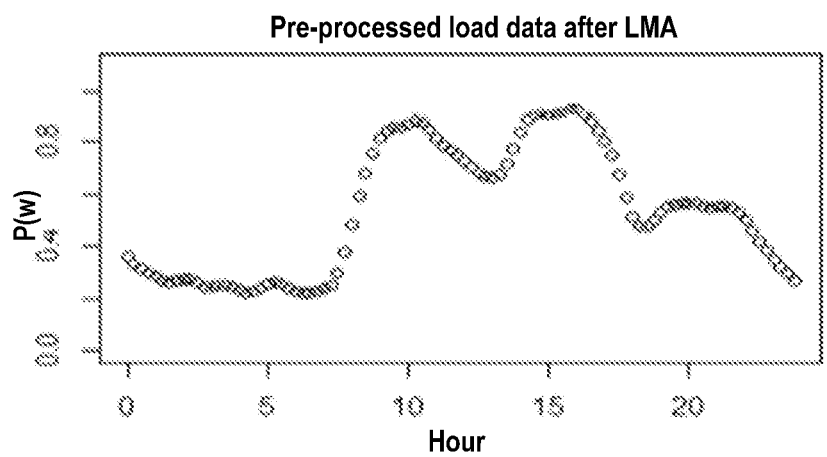

FIGS. 4A to 4C illustrate diagrams showing comparison of results of MA and LMA according to an embodiment of the present disclosure. The proposed LMA is performed for a commercial customer on its load data collected per 15 minutes in one day. The LMA terminates automatically after 3 loop cycles because the number of turning points of the load curve does not decrease any more by the third loop cycle. FIG. 4A illustrates the original load data of the power customer, FIG. 4B illustrates the result of pre-processing data points by MA and FIG. 4C illustrates the result of pre-processing data points by LMA. It is clear from FIG. 4 that the LMA could provide better filtering effects without distorting the original load curve.

After obtaining the filtered load data, it may perform for example DBSCAN on the filtered load data. Next, detailed description will be made to the density-based clustering with regard to the distance matrix, and two clustering parameters.

Distance Matrix

The distance matrix used in this algorithm is constructed based on the distances between each load points, which may be expressed by $$DIST_{n \times m} = \{dist(i,j) | 1 \le i \le n, 1 \le j \le n\} \quad (3)$$

wherein the dist(i,j) is the distance between points i and j, which is usually calculated as Euclidean distance which is given in equation (4).

$$Edist(i,j) = \sqrt{P(j) - P(i))^2 + (j-i)^2} \quad (4)$$

However, in the present disclosure, dist(i,j) is defined as weighted distance which can be written as $$dist(i,j) = \sqrt{((P(j) - P(i)) \times n)^2 + (j-i)^2} \quad (5)$$

In such a way, the y-distance component of the distance can be stretched to the same level as the x-distance of i and j, wherein the x-distance is the squared difference of i and j, and the y-distance is the stretched squared difference of P(i) and P(j) distance. This is because that the load data is normalized in this method so the load value in y-axis is within [0, 1] while the value of time intervals in x-axis is within [1, n], which is much greater than that of y-dimension. Without the stretching, the distance signal will be deeply affected by x-dimension and cannot effectively reflect the valuable y-dimension volatility signals.

Clustering Parameters

In the present disclosure, two parameters used in clustering include MinPts, i.e., the minimum number of data points required in a cluster or the minimum number of data points required to form a dense region, and the scanning radius ε(eps), which can be determined self-adaptively. The parameter MinPts is used to determine the minimum size of a cluster. The parameter ε(eps) is used as a radius for scanning the neighboring data points of a data point. If after scanning, it contains sufficient points not less than MinPts, a cluster is started; otherwise, the point is labeled as noise, which, however, can be founded in a sufficiently sized ε-environment of another point and be a part of another cluster. The parameter MinPts may be set as the number of the load points collected in one hour, which means, if the a load curve is collected per 15 minutes, then the MinPts is better to be 4. This is because the peak or valley pieces of load often last more than one hour and this possibility is rather high. In the present disclosure, the parameter ε(eps) is determined based on K-distance of points of the load curve of the power customer. The K-distance is a distance of a data point from its nearest K-th data point, which can be can be calculated by equation (5). The K may equal to the minimum number of data points required in a cluster, for example 4.

In an example embodiment of the present disclosure, these data points may be sequenced by their respective k-distance so as to form a sequenced K-distance plot. The parameter ε(eps) can be set as the k-distance of the transition point S in the sequenced k-distances plot where the sequenced k-distances starts to change dramatically.

Usually, the position of S and the corresponding ε(eps) are determined by manual observation. However it is not suitable in the present disclosure, because of a great number of power customers. Thus, to determine parameter ε(eps) automatically, a method is proposed as below.

Figure 5:
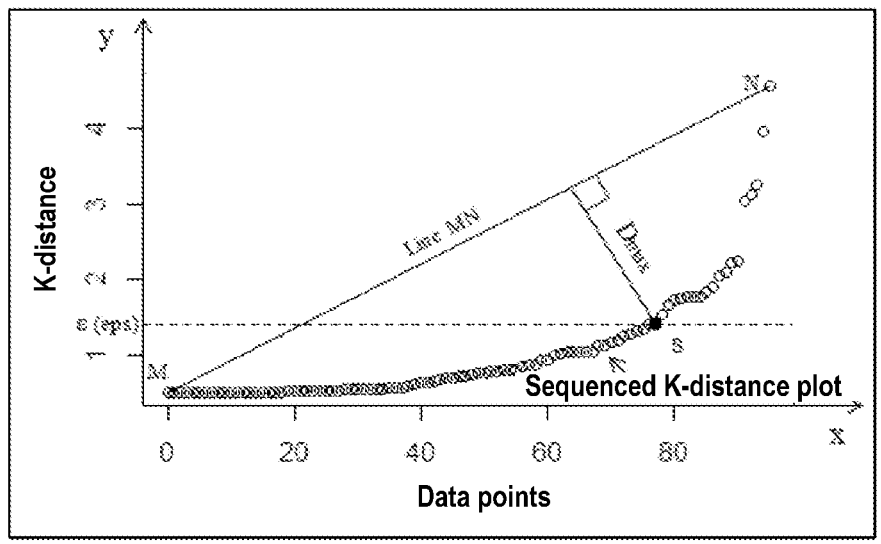
FIG. 5 schematically illustrates a diagram of determining the scanning radius for clustering according to an embodiment of the present disclosure.

Firstly, as illustrated in FIG. 5 a connection line MN is drawn between the start point and the end point of the sequenced k-distances plot. The line MN can be then expressed as below, $$Ax + By + C = 0 \quad (6)$$

wherein, $$A = \frac{y_N - y_M}{x_N - x_M} \quad (7)$$

$$B = -1 \quad (8)$$

$$C = y_M - A x_M \quad (9)$$

Secondly, equation 6 is used to calculate the vertical distance D from Line MN to each point of the sequenced k-distances plot, $$D = \frac{|Ax_i + By_i + C|}{\sqrt{A^2 + B^2}} \quad i \in (1, \ldots, n) \quad (10)$$

Thirdly, the calculated vertical distances are compared to find the transition point S which has the largest distance from the line MN. Then the k-distance corresponding to the point S is determined as the proper ε(eps) value, as illustrated in FIG. 5.

Figure 6:
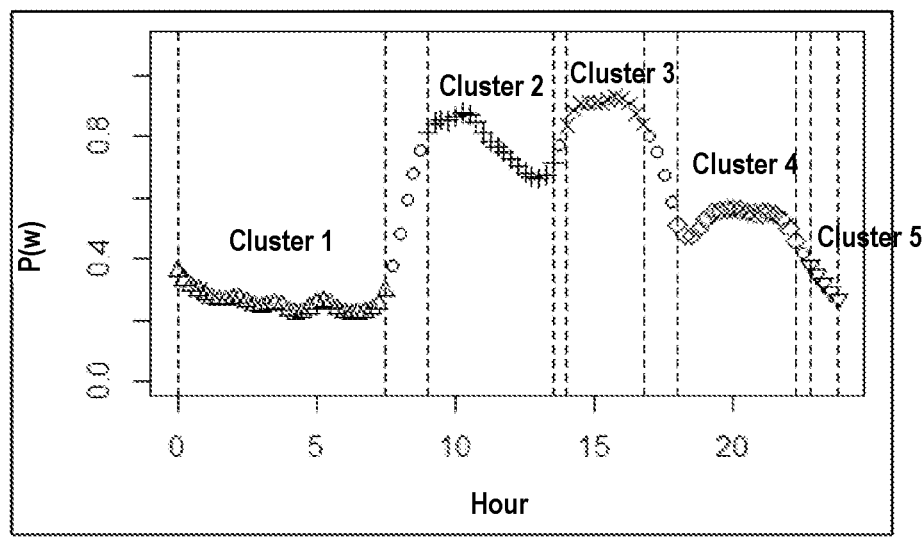
FIG. 6 schematically illustrates a diagram showing an example result of performing density-based spatial clustering according to an embodiment of the present disclosure.

Once getting the distance matrix and the two parameters above, the DBSCAN can be performed based on them and the peak & valley points could be easily clustered. In such a way, it can obtain one or more clusters of peak and/or valley period just as illustrated in FIG. 6, wherein data points denoted by the same shape belong to the same cluster and the data points with a circle shape are data points not belonging to any cluster. For example, the data points denoted by triangles belongs to cluster 1, data points denoted by plus signs belong to cluster 2 and so on. Besides, it is also seen the proper boundaries can be effectively identified. Thus this method can be self-adaptive to different load data, and no pre-specified parameters are required.

After the boundary points are determined, it may detect tendency turning points of the load curve in each piece of the load curve split by means of the boundary points, so as to identify the load volatility of the power customer at step S201 just as illustrated in FIG. 2.

Figure 7:
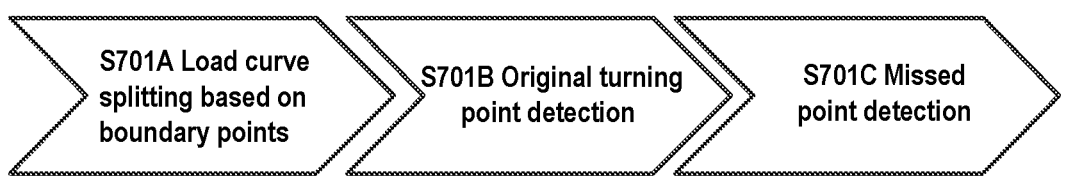
FIG. 7 schematically illustrates a diagram of operations of detecting tendency turning points of the load curve by means of the determined boundary points according to an embodiment of the present disclosure.
Figure 8A:
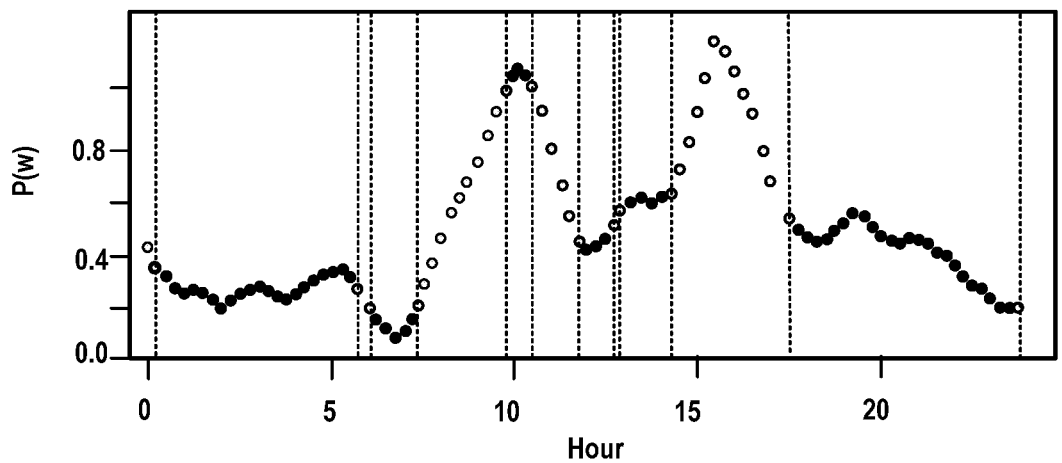
FIGS. 8A to 8D schematically illustrate diagrams of operations of segmentation and detected turning points according to an embodiment of the present disclosure.

Particularly, as illustrated in FIG. 7, first at step S701, the load curve splitting is performed based on the boundary points as determined in step S201. In other words, the start points and end points of each cluster may be taken as the boundary points to split the load curve into a plurality of segments. FIG. 8A schematically illustrates this load curve splitting operation.

Figure 8B:
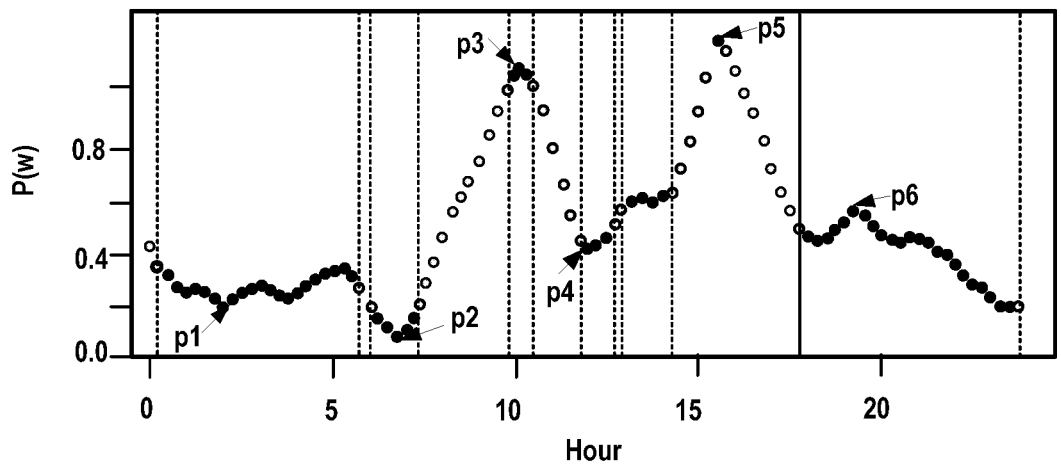

Then at step S702, the original turning points are detected in each segment. Specially, it may find the maximum and minimum values within each segment. If the maximum and minimum values are the boundary points of the segment, it means there is no turning point in this segment, while if there is a maximum or minimum value which is not a boundary point of the segment, it means there is a turning point within this segment. As illustrated in FIG. 8B, there are find six original turning points p1 to p6.

Figure 9A:
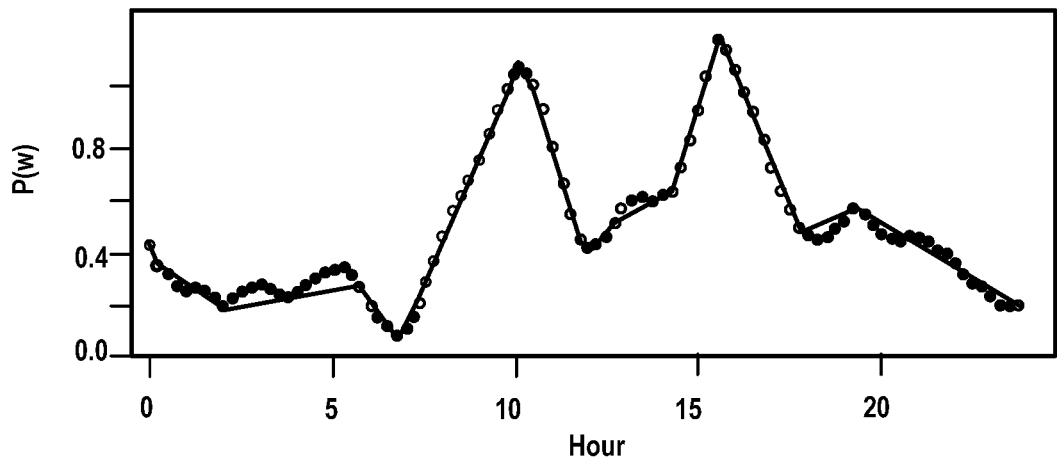
FIG. 9A to 9D schematically illustrate a diagram of example tendency curves of the load volatility of a power customer according to an embodiment of the present disclosure.

The found turning points p1 to p6 and boundary points for splitting the load curve may be used to represent the load volatility. For example, linear interpolation may be performed on these points to form a tendency curve of the load volatility of the customer. The linear interpolation is a known interpolation method and thus will not be elaborated herein for a purpose of simplification. FIG. 9A schematically illustrates a tendency curve of load volatility of a power customer by performing linear interpolation.

Figure 9B:
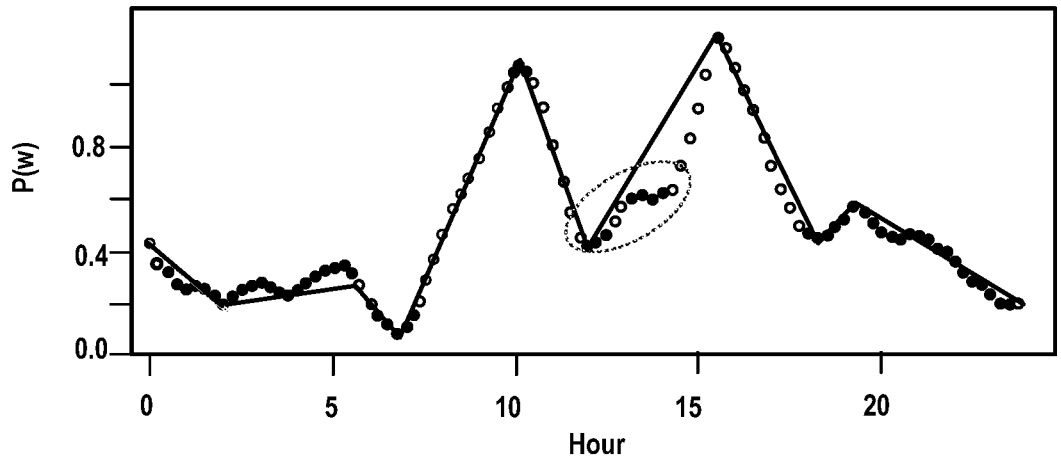

Preferably, a piecewise linear interpolation (PLI) may be formed on the found turning points and the boundary points. Particularly, linear interpolation may be first performed on the found turning points and boundary points. Then neighboring segments with same tendency are identified. Among the neighboring segments, only a first start point and the last end point are left and all middle turning points are omitted. That is to say, for the neighboring segments, the start point of the first segment and the end point of the last segment are kept and all other points are neglected. Afterwards, inner interpolation may be performed again on the remaining points to obtain a tendency curve represent the main fluctuation of the load volatility of the customer. An example tendency curve of the load volatility of the customer is illustrated in FIG. 9B.

However, the inventors notice that it might not obtain accurate tendency turning points in step S702, for example some tendency turning points might be missed. In order to obtain more accurate load volatility, preferably, at step S703, the load curve may be re-split by at least partially using new found turning points and the process of finding turning points may be performed again.

Figure 8C:
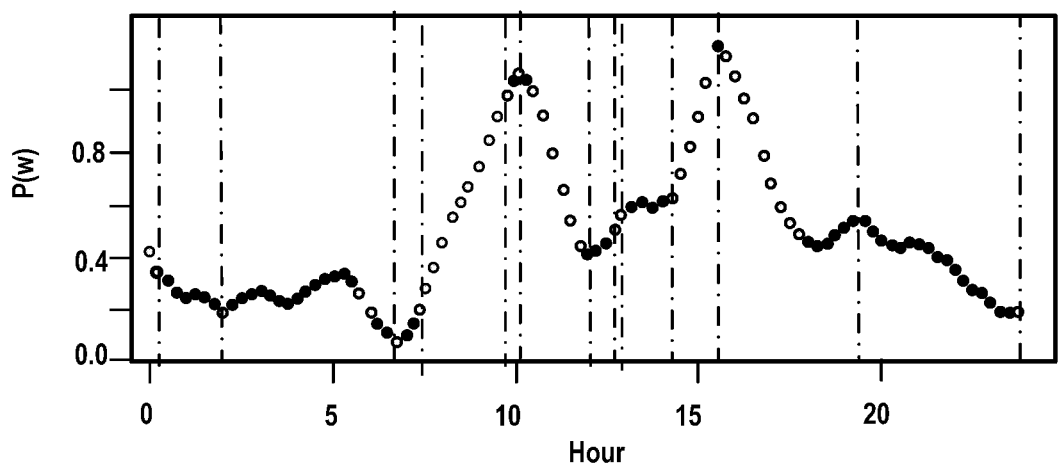

This process may be performed in different ways. As an example, turning points detected at step S702 and the original boundary points can be used to re-split the original load curve. Besides, it is also possible to use only the detected turning points to re-split the original load curve. However, for a purpose of illustration, there will be provided an example implementation for this process. In an embodiment of the present disclosure, if a turning point is found in a segment in step S702, this turning point will replace one of the boundary point which does not have either a maximum value or a minimum value; or in other word, the boundary point will be moved from the original one to the found turning point, as illustrated in FIG. 8C.

Figure 8D:
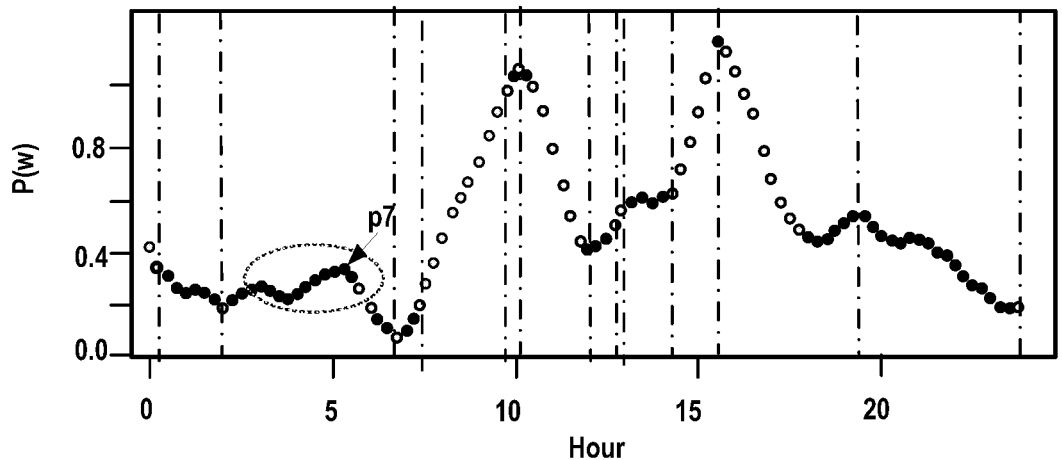

After that, operation of detecting turning points is re-performed within each newly split segment to find new turning points. As illustrated in FIG. 8D, a new turning point p7 is further found. In such a way, some missed trendy point in step 702 can be further detected. This often occurs in an original cluster where more than one turning point is included and at least one of these turning points is neither of the maximum value or the minimum value.

The newly detected turning points may be also used to represent the load volatility together with the turning points founded at step S702. It can be appreciated it is also possible to repeat the step S703 more times to further reduce the possibility of missing turning points. However, it may be appreciated that the load volatility mainly focuses the main fluctuations of a load pattern and minor changes can be neglected and thus it is enough to perform step S703 once, because it can detect the missed important turning points at a very high probability.

Figure 9C:
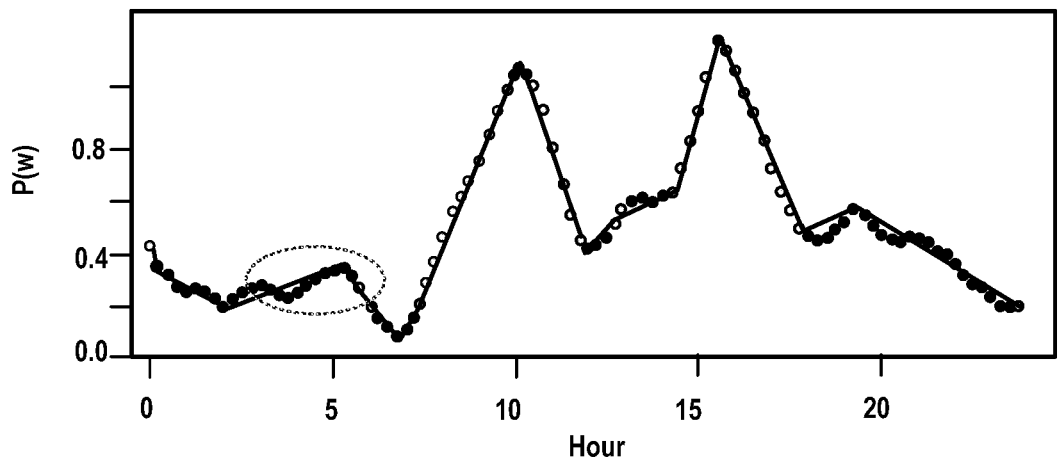

After the tendency turning points of the load curve are detected, linear interpolation may be further performed on the turning points and the boundary points to connect these points and form a tendency curve represent the fluctuation of the load curve of a customer. FIG. 9C illustrates a resulting tendency curve of the load volatility of a power customer obtained by performing linear interpolation on these points.

Figure 9D:
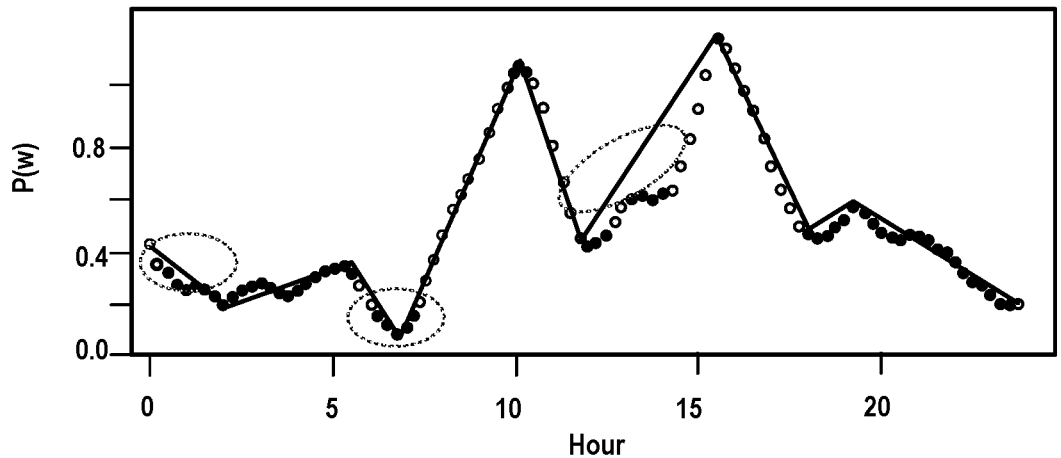

Additionally, further operations may also be made to identify main tendency turning points representing main fluctuations of the load volatility of the power customer. That is to say, it may perform PLI on these detecting turning points and boundary points instead of only linear interpolation. Thus, after linear interpolation, it may detect adjacent segments with same tendency, and middle points of the adjacent segments with same tendency may be omitted. In such a way, only main tendency turning points representing main fluctuations of the load volatility of the power customer can be maintained. FIG. 9D illustrates an example tendency curve of the load volatility of a power customer, from which it may be seen that, the tendency curve can well represent the tendency of the main fluctuant and does not include other information unrelated to the main fluctuant.

With embodiments of the present disclosure, the boundary points for splitting the load curve may be automatically determined based on load data of each power customer instead of using a predetermined threshold, which could provide a solution of self-adapted auto-identification for load volatility. Besides, by means of LMA, it may filter out the random noises of the load data as much as possible. Thus the random small turbulences may be filtered out effectively and in turn the performance of load volatility identification may be improved greatly.

Figure 10:
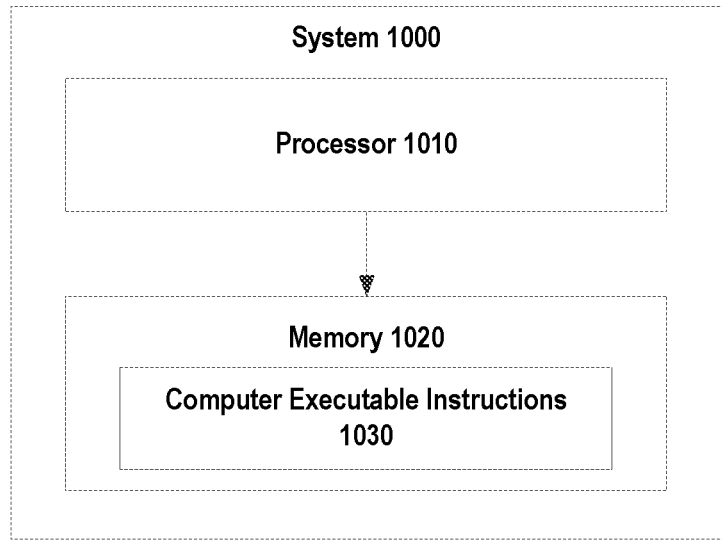
FIG. 10 schematically illustrates a block diagram of a system for identifying load volatility of a power customer according to an embodiment of the present disclosure.

Additionally, in embodiments of the present disclosure, there is also provided a system for identifying load volatility of a power customer, which will be described with reference to FIG. 10. As illustrated in FIG. 10, the system 1000 may comprise at least one processor 1010 and at least one memory 1020 storing computer executable instructions 1030. The at least one memory 1010 and the computer executable instructions 1030 may be configured to, with the at least one processor 1020, cause the system 1000 to: determine boundary points for splitting a load curve of a power customer automatically, through performing density-based spatial clustering on data points of the load curve of the power customer; and detect tendency turning points of the load curve by means of the determined boundary points, so as to identify the load volatility of the power customer.

In an embodiment of the present disclosure, the density-based spatial clustering may be performed based on clustering parameters including a minimum number of data points required in a cluster and a scanning radius.

In another embodiment of the present disclosure, the scanning radius may be determined based on K-distance of points of the load curve of the power customer, wherein the K-distance is a distance of a data point from its nearest K-th data point and the K equals to the minimum number of data points required in a cluster.

In a further embodiment of the present disclosure, the scanning radius may be determined as K-distance of a point of a sequenced K-distance plot which is furthest from a line through a start point and an end point of the sequenced K-distance plot, wherein the sequenced K-distance plot is a plot formed from data points sequenced by K-distance.

In a still further embodiment of the present disclosure, the minimum number of data points required in a cluster may be defined as the number of data points collected in an hour.

In a yet further embodiment of the present disclosure, the detecting tendency turning points of the load curve may comprise: detecting turning points in the each segment of the load curve split based on the determined boundary points.

In a still yet further embodiment of the present disclosure, the detecting tendency turning points of the load curve may further comprise: detecting a missing turning point in each segment of the load curve re-split by at least partially using the detected turning points.

In a yet still further embodiment of the present disclosure, wherein the system 1000 may be further configured to perform moving average on the data points of the load curve of the power customer repeatedly before determining the boundary points, until the number of turning points of the load curve is not decreased.

In another embodiment of the present disclosure, the system 1010 may be further configured to perform linear interpolation on the boundary points and the detected turning points.

In a further embodiment of the present disclosure, the system is further configured to identify main tendency turning points representing main fluctuations of the load volatility of the power customer by omitting middle points of adjacent segments with same tendency.

Figure 11:
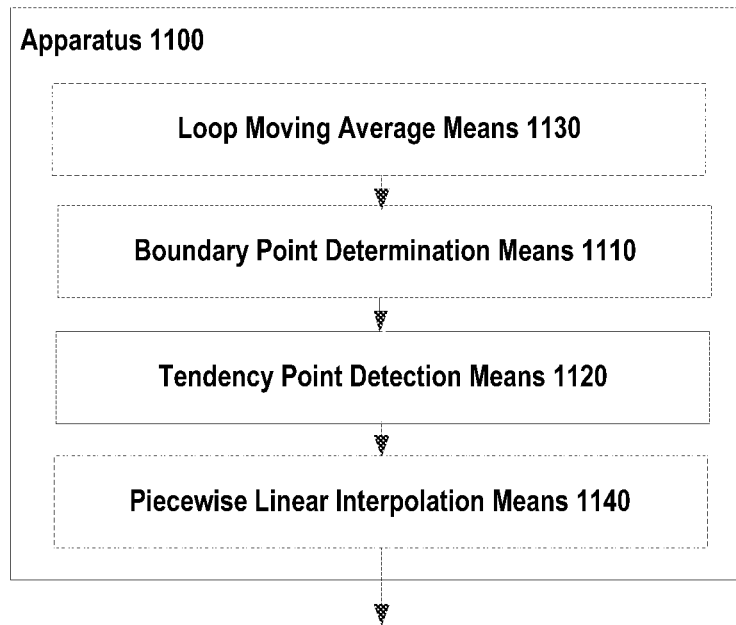
FIG. 11 schematically illustrates a block diagram of an apparatus for identifying load volatility of a power customer according to an embodiment of the present disclosure.

Besides, there is also provided an apparatus for identifying load volatility of a power customer, which will be described with reference to FIG. 11. As illustrated in FIG. 11, the apparatus 1100 may comprise: means 1110 for determining boundary points for splitting a load curve of a power customer automatically, through performing density-based spatial clustering on data points of the load curve of the power customer; and means 1120 for detecting tendency turning points of the load curve by means of the determined boundary points, so as to identify the load volatility of the power customer.

In an embodiment of the present disclosure, means 1110 for determining boundary points may be configured to perform the density-based spatial clustering based on clustering parameters including a minimum number of data points required in a cluster and scanning radius.

In another embodiment of the present disclosure, the scanning radius may be determined based on K-distance of points of the load curve of the power customer, wherein the K-distance is a distance of a data point from its nearest K-th data point and the K equals to the minimum number of data points required in a cluster.

In a further embodiment of the present disclosure, the scanning radius may be determined as K-distance of a point of a sequenced K-distance plot which is furthest from a line through a start point and an end point of the sequenced K-distance plot, wherein the sequenced K-distance plot is a plot formed from data points sequenced by K-distance.

In a still further embodiment of the present disclosure, the minimum number of data points required in a cluster may be defined as the number of data points collected in an hour.

In a yet further embodiment of the present disclosure, the means 1120 for detecting tendency turning points of the load curve may be configured to detect turning points in the each segment of the load curve split based on the determined boundary points.

In a still yet further embodiment of the present disclosure, the means 1120 for detecting tendency turning points of the load curve may be further configured to detect a missing turning point in each segment of the load curve re-split by at least partially using the detected turning points.

In a yet still further embodiment of the present disclosure, the apparatus 1100 may further comprise means 1130 for performing moving average on the data points of the load curve of the power customer repeatedly before determining the boundary points, until the number of turning points of the load curve is not decreased.

In another embodiment of the present disclosure, the apparatus 1100 may further comprise means 1140 for performing linear interpolation on the boundary points and the detected turning points.

In a further embodiment of the present disclosure, means 1140 for performing linear interpolation may be further configured to identify main tendency turning points representing main fluctuations of the load volatility of the power customer by omitting middle endpoints of adjacent segments with same tendency.

Figure 12:
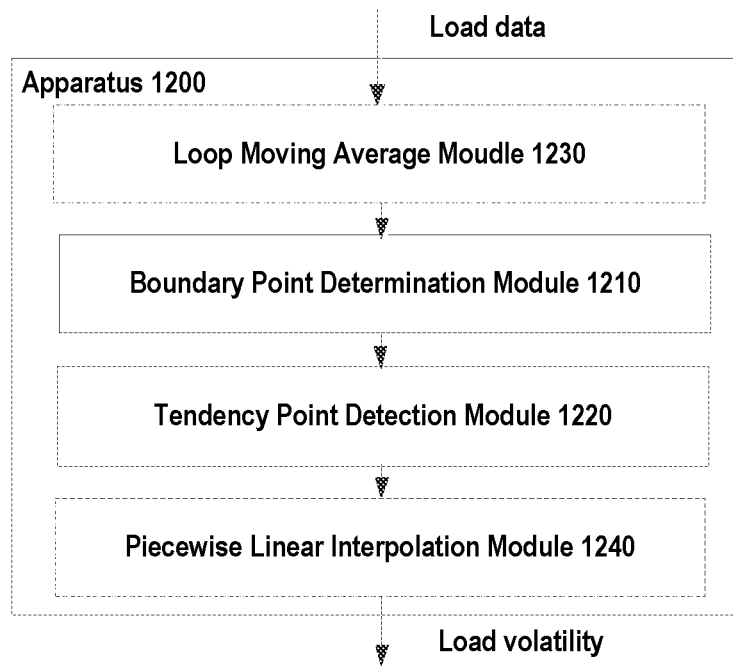
FIG. 12 schematically illustrates a block diagram of an apparatus for identifying load volatility of a power customer according to another embodiment of the present disclosure.

In addition, there is further provided an apparatus for identifying load volatility of a power customer. FIG. 12 schematically illustrates a block diagram of an apparatus for distribution network reconfiguration according to an embodiment of the present disclosure. The apparatus 1200 may comprise: boundary point determination module 1210 configured to determine boundary points for splitting a load curve of a power customer automatically, through performing density-based spatial clustering on data points of the load curve of the power customer; and tendency point detection module 1220 for detecting tendency turning points of the load curve by means of the determined boundary points, so as to identify the load volatility of the power customer.

In an embodiment of the present disclosure, the boundary point determination module 1210 may be configured to perform the density-based spatial clustering based on clustering parameters including a minimum number of data points required in a cluster and a scanning radius.

In another embodiment of the present disclosure, the scanning radius may be determined based on K-distance of points of the load curve of the power customer, wherein the K-distance is a distance of a data point from its nearest K-th data point and the K equals to the minimum number of data points required in a cluster.

In a further embodiment of the present disclosure, the scanning radius may be determined as K-distance of a point of a sequenced K-distance plot which is furthest from a line through a start point and an end point of the sequenced K-distance plot, wherein the sequenced K-distance plot is a plot formed from data points sequenced by K-distance.

In a still further embodiment of the present disclosure, the minimum number of data points required in a cluster may be defined as the number of data points collected in an hour.

In a yet further embodiment of the present disclosure, the tendency turning points detection module 1220 may be configured to detect turning points in the each segment of the load curve split based on the determined boundary points.

In a still yet further embodiment of the present disclosure, the tendency turning points detection module 1220 may be further configured to detect a missing turning point in each segment of the load curve re-split by at least partially using the detected turning points.

In a yet still further embodiment of the present disclosure, the apparatus 1100 may further comprise loop moving average module 1230 configured to perform moving average on the data points of the load curve of the power customer repeatedly before determining the boundary points, until the number of turning points of the load curve is not decreased.

In another embodiment of the present disclosure, the apparatus 1200 may further comprise piecewise linear interpolation 1240 for performing linear interpolation on the boundary points of respective segments and the detected turning points.

In a further embodiment of the present disclosure, the piecewise linear interpolation 1240 may be further configured to identify main tendency turning points representing main fluctuations of the load volatility of the power customer by omitting middle endpoints of adjacent segments with same tendency.

Furthermore, there is provided a tangible computer-readable medium having a plurality of instructions executable by a processor to manage loads of a power grid, the tangible computer-readable medium may comprise instructions configured to perform steps of the method according to any embodiments of method of the present disclosure.

It should be noted that operations of respective models or means as comprised in the system 1000, apparatus 1100, and apparatus 1200 substantially correspond to respective method steps as previously described. Therefore, for detailed operations of respective models or means in the system 1000, apparatus 1100, apparatus 1200, please refer to the previous descriptions of the methods of the present disclosure with reference to FIGS. 2 to 9.

Figure 13:
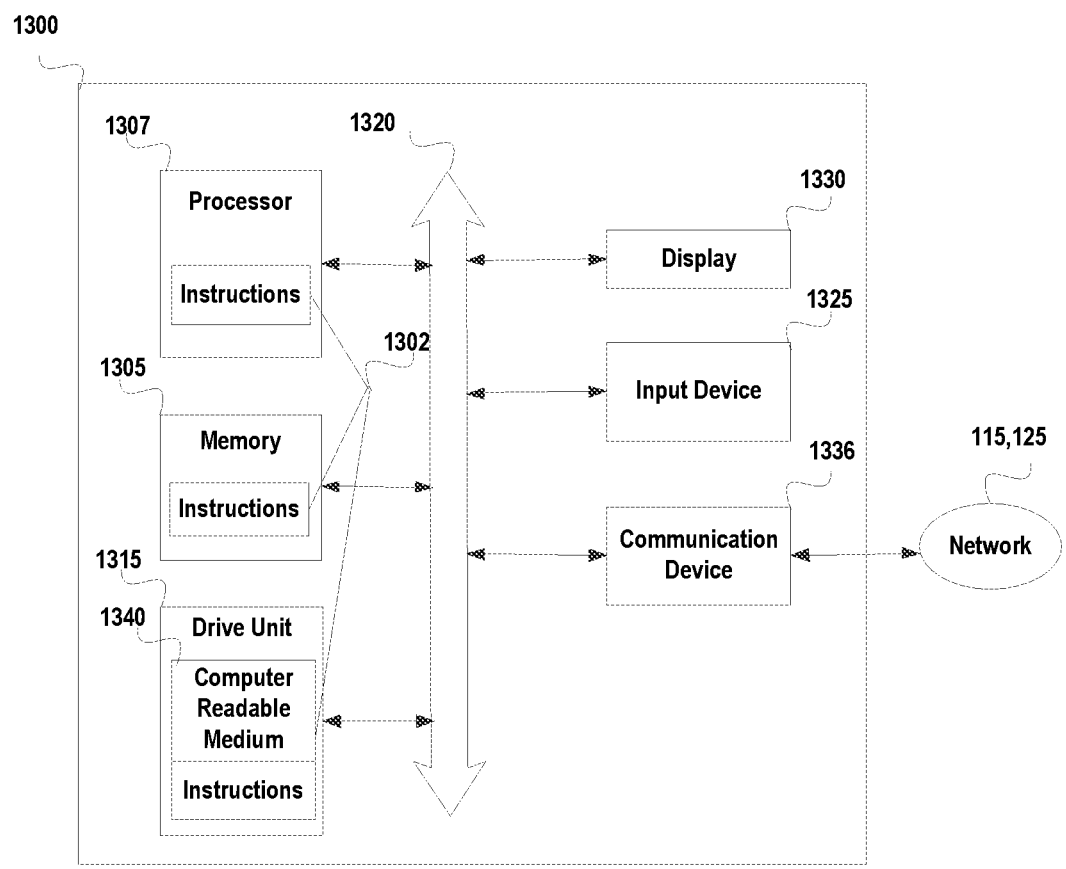
FIG. 13 schematically illustrates schematically illustrates a general computer system, programmable to be a specific computer system, which may represent any of the computing devices referenced herein.

FIG. 13 is a general computer system 1300, which may represent any of the computing devices referenced herein. For instance, the general computer system 1300 may represent—in part or in its entirety—the control center, the head end, the integrated network operations and management system (NOMS), the fault, performance, and configuration management (FPCM) module, or any other computing devices referenced herein such as the end devices, the meters, the telemetry interface units (TIUs), the collectors, and/or any networked components such as routers, switches or servers as discussed herein. The computer system 1300 may include an ordered listing of a set of instructions 1302 that may be executed to cause the computer system 1300 to perform any one or more of the methods or computer-based functions disclosed herein. The computer system 1300 may operate as a stand-alone device or may be connected, e.g., using the network 115, 125, to other computer systems or peripheral devices.

In a networked deployment, the computer system 1300 may operate in the capacity of a server or as a client-user computer in a server-client user network environment, or as a peer computer system in a peer-to-peer (or distributed) network environment. The computer system 1300 may also be implemented as or incorporated into various devices, such as a personal computer or a mobile computing device capable of executing a set of instructions 1302 that specify actions to be taken by that machine, including and not limited to, accessing the network 115, 125 through any form of browser. Further, each of the systems described may include any collection of sub-systems that individually or jointly execute a set, or multiple sets, of instructions to perform one or more computer functions.

The computer system 1300 may include a processor 1307, such as a central processing unit (CPU) and/or a graphics processing unit (GPU). The processor 1307 may include one or more general processors, digital signal processors, application specific integrated circuits, field programmable gate arrays, digital circuits, optical circuits, analog circuits, combinations thereof, or other now known or later-developed devices for analyzing and processing data. The processor 1307 may implement the set of instructions 1302 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility with computer processing or networked communication.

The computer system 1300 may include a memory 1305 on a bus 1320 for communicating information. Code operable to cause the computer system to perform any of the acts or operations described herein may be stored in the memory 1305. The memory 1305 may be a random-access memory, read-only memory, programmable memory, hard disk drive or any other type of volatile or non-volatile memory or storage device.

The computer system 1300 may also include a disk, solid-state drive optical drive unit 1315. The disk drive unit 1315 may include a non-transitory or tangible computer-readable medium 1340 in which one or more sets of instructions 1302, e.g., software, can be embedded. Further, the instructions 1302 may perform one or more of the operations as described herein. The instructions 1302 may reside completely, or at least partially, within the memory 1305 and/or within the processor 1307 during execution by the computer system 1300. The database or any other databases described above may be stored in the memory 1305 and/or the disk unit 1315.

The memory 1305 and the processor 1307 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1300 may include an input device 1325, such as a keyboard or mouse, configured for a user to interact with any of the components of system 1300, including user selections or menu entries of display menus. It may further include a display 1330, such as a liquid crystal display (LCD), a cathode ray tube (CRT), or any other display suitable for conveying information. The display 1330 may act as an interface for the user to see the functioning of the processor 1307, or specifically as an interface with the software stored in the memory 1305 or the drive unit 1315.

The computer system 1300 may include a communication interface 1336 that enables communications via the communications network 125. The network 125 may include wired networks, wireless networks, or combinations thereof. The communication interface 1336 networks may enable communications via any number of communication standards, such as Ethernet AVB, 802.11, 802.13, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 1307. Software modules may include instructions stored in the memory 1305, or other memory device, that are executable by the processor 1307 or other processors. Hardware modules may include various devices, components, circuits, gates, circuit boards, and the like that are executable, directed, and/or controlled for performance by the processor 1307.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

By far, the present disclosure has been described with reference to the accompanying drawings through particular preferred embodiments. However, it should be noted that the present disclosure is not limited to the illustrated and provided particular embodiments, but various modification may be made within the scope of the present disclosure.

Further, the embodiments of the present disclosure can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example, a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example, by firmware.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A system for identifying load volatility of a power customer, the system comprising:
at least one processor; and
at least one memory storing computer executable instructions,
wherein the at least one memory and the computer executable instructions are configured to, with the at least one processor, cause the system to:
determine boundary points for splitting a load curve of a power customer automatically, by multiple iteration filtration of data points of the load curve of the power customer, and density-based spatial clustering of the multiple iteration filtered data points of the load curve of the power customer;
detect tendency turning points of the load curve based on analysis the determined boundary points, so as to identify the load volatility of the power customer, the tendency turning points being transition points between an uptrend and a downtrend of the load curve; and
control power generation and power distribution to the power customer according to the identified load volatility of the power customer.

2. The system according to claim 1, wherein the density-based spatial clustering is performed based on clustering parameters including a minimum number of data points required in a cluster and a scanning radius.

3. The system according to claim 2, wherein the scanning radius is determined based on a K-distance of points of the load curve of the power customer, wherein the K-distance is a distance of a data point from its nearest K-th data point and the K equals to the minimum number of data points required in the cluster.

4. The system according to claim 3, wherein the scanning radius is determined as a K-distance of a point of a sequenced K-distance plot which is furthest from a line through a start point and an end point of the sequenced K-distance plot, wherein the sequenced K-distance plot is a plot formed from data points sequenced by K-distance.

5. The system according to claim 2, wherein the minimum number of data points required in the cluster is defined as the number of data points collected in an hour.

6. The system according to claim 1, wherein the detecting tendency turning points of the load curve comprises:
detecting turning points in each segment of the load curve split based on the determined boundary points.

7. The system according to claim 6, wherein the detecting tendency turning points of the load curve further comprises:
detecting a missing turning point in each segment of the load curve re-split by at least partially using the detected turning points.

8. The system according to claim 1, wherein the computer executable instructions being configured to, with the at least one processor, cause the system to determine boundary points for splitting the load curve of the power customer automatically by multiple iteration filtering of data points of the load curve of the power customer comprises instructions to cause the system to perform moving average on the data points of the load curve of the power customer repeatedly until a predetermined condition is reached, before determining the boundary points, the predetermined condition being when the number of turning points of the load curve is not further decreased by the multiple iteration filtering.

9. The system according to claim 1, wherein the system is further configured to perform linear interpolation on the boundary points and the detected turning points.

10. The system according to claim 9, wherein the system is further configured to identify main tendency turning points representing main fluctuations of the load volatility of the power customer by omitting middle endpoints of adjacent segments with same tendency.

11. A method for identifying load volatility of a power customer, comprising:
  determining boundary points for splitting a load curve of a power customer automatically, by:
    filtering, in multiple iterations, data points of the load curve of the power customer, and performing density-based spatial clustering of the filtered data points of the load curve of the power customer; and
    detecting tendency turning points of the load curve based on analysis of the determined boundary points, so as to identify the load volatility of the power customer, wherein the tendency turning points are transition points between an uptrend and a downtrend of the load curve; and
  controlling generation of power and a distribution network to supply power to the power customer according to the identified load volatility.

12. The method according to claim 11, wherein the density-based spatial clustering is performed based on clustering parameters including a minimum number of data points required in a cluster and a scanning radius.

13. The method according to claim 12, wherein the scanning radius is determined based on a K-distance of points of the load curve of the power customer, wherein the K-distance is a distance of a data point from its nearest K-the data point and the K equals to the minimum number of data points required in the cluster.

14. The method according to claim 13, wherein the scanning radius is determined as a K-distance of a point of a sequenced K-distance plot which is furthest from a line through a start point and an end point of a sequenced K-distance plot, wherein the sequenced K-distance plot is a plot formed from data points sequenced by K-distance.

15. The method according to claim 12, wherein the minimum number of data points required in the cluster is defined as the number of data points collected in an hour.

16. The method according to claim 11, wherein the detecting tendency turning points of the load curve comprises:
  detecting turning points in each segment of the load curve split based on the determined boundary points.

17. The method according to claim 16, wherein the detecting tendency turning points of the load curve further comprises detecting a missing turning point in each segment of the load curve re-split by at least partially using the detected turning points.

18. The method according to claim 11, wherein filtering, in multiple iterations, data points of the load curve of the power customer further comprises:
  filtering in multiple iterations by performing moving average on the data points of the load curve of the power customer repeatedly, until a predetermined condition is reached, before determining the boundary points, the predetermined condition being when the number of turning points of the load curve is not further decreased by the filtering.

19. The method according to claim 11, further comprising:
  performing linear interpolation on the boundary points and the detected turning points.

20. The method according to claim 11, further comprising:
  identifying main tendency turning points representing main fluctuations of the load volatility of the power customer by omitting middle endpoints of adjacent segments with same tendency.

21. A non-transitory tangible computer-readable medium having a plurality of instructions executable by a processor to reconfigure the distribution network, the tangible computer-readable medium comprises instructions configured to perform steps of the method according to claim 11.

22. An apparatus for identifying load volatility of a power customer, comprising:
  a processor and a memory storing instructions executable by the processor;
  a boundary point determination instruction stored in the memory and executable by the processor to determine boundary points for splitting a load curve of a power customer automatically, by filtration of data points of the load curve multiple times, and performance of density-based spatial clustering of the filtered data points of the load curve of the power customer;
  a tendency point detection instruction stored in the memory and executable by the processor to detect tendency turning points of the load curve based on analysis of the determined boundary points, so as to identify the load volatility of the power customer, the tendency turning points being transition points between an uptrend and a downtrend of the load curve; and
  instructions executable by the processor to control power generation and power distribution to the power customer according to the identified load volatility of the power customer.

* * * * *